Patented Dec. 8, 1931

1,835,050

UNITED STATES PATENT OFFICE

LOUIS H. HOWLAND, OF PASSAIC, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing. Application filed October 24, 1930. Serial No. 491,066.

This invention relates to the treatment of rubber, and particularly to vulcanization of the same using new accelerators of vulcanization. It also relates to the resulting products.

An object of this invention is to provide a new class of accelerators for the vulcanization of rubber and similar vulcanizable materials. A further object is to provide a class of accelerators which function well in stocks containing more than 30 parts by weight of carbon black per 100 parts of rubber.

The invention accordingly comprises broadly treating rubber with a compound having the general formula

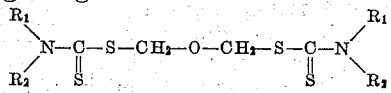

where $R_1$ is an alkyl group and $R_2$ is an alkyl or aryl group, or $R_1$ and $R_2$ together form a divalent radical, such as pentamethylene or similar group. These compounds are termed oxy-dimethylene-N-substituted dithiocarbamates. They are prepared by reacting, preferably in alcoholic solution, a salt (preferably the sodium salt) of the N-substituted dithiocarbamic acid with a di-halogen-methyl ether, preferably the dichloro-methyl-ether. The dichloro-methyl-ether may also be called oxy-dimethylene chloride in order to make clear its relation to the final product. The reaction may be represented as follows:

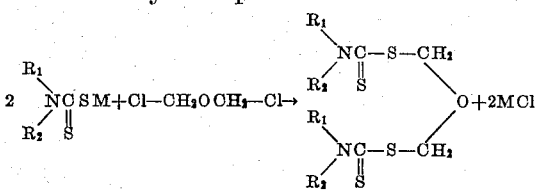

Their preparation is illustrated more specifically below:

*Example 1.—Oxy-dimethylene dimethyl dithiocarbamate.*—A concentrated aqueous solution containing two moles of sodium dimethyl dithiocarbamate is dissolved in twice its volume of 95% alcohol. To this solution is added slowly, while stirring, an alcoholic solution containing one mole of sym-dichloromethyl ether. Heat is evolved, and a voluminous white crystalline mass separates.

After the mixture is allowed to stand a short time, the precipitated product is filtered off, washed thoroughly with alcohol and is then dried.

The yield is practically quantitative.

The white crystalline product melts at 112–114° C. It is insoluble in water, slightly soluble in alcohol, and soluble in acetone and in benzol.

*Example 2.—Oxy-dimethylene diethyl dithiocarbamate.*—An alcoholic solution containing one mole of sym-dichloromethyl ether is run slowly into an alcoholic solution containing 2 moles of diethyl ammonium diethyl dithiocarbamate. A rise in temperature occurs. After the mixture is allowed to stand for several hours, it is diluted with water. An oil precipitates. The oil is recovered and is washed thoroughly with water, and is then dried. The product is a light yellow liquid, which decomposes when distilled at a pressure of 10 mm. of mercury.

The yield is about quantitative.

The preferred embodiments of the invention are illustrated as follows, but are not to be construed as limiting thereof:

*Example 3.*—I mix on the mill, in the usual manner, 0.3 part of oxy-dimethylene dimethyl dithiocarbamate with a typical tread stock containing 100 parts of smoked sheet rubber. Portions of this mix are vulcanized in a mold at a temperature corresponding to a steam pressure of 25 pounds per square inch, for 20, 30, 45, 60 and 75 minutes, and give the following tensiles (lbs. per sq. in.):

| Cure | Tensile | Per cent elongation |
|---|---|---|
| 20′ at 25# | 3263 | 680 |
| 30′ at 25# | 4523 | 690 |
| 45′ at 25# | 4820 | 700 |
| 60′ at 25# | 4543 | 680 |
| 75′ at 25# | 4223 | 620 |

*Example 4.*—I mix on the mill, in the usual manner, 0.4 part of oxy-dimethylene diethyl dithiocarbamate with a typical tread stock containing 100 parts of smoked sheet rubber. Portions of this mix are vulcanized in a mold at a temperature corresponding to a steam pressure of 25 pounds per square inch, for 30, 45, 60, 75 and 90 minutes, and gives the following tensiles:

| Cure | Tensiles | Per cent elongation |
|---|---|---|
| 30' at 25# | 4435 | 680 |
| 45' at 25# | 4717 | 680 |
| 60' at 25# | 4757 | 660 |
| 75' at 25# | 4437 | 630 |
| 90' at 25# | 3820 | 580 |

Increased strength and a superior finish can be conferred upon the rubber goods by vulcanizing them in an atmosphere containing a basic gas such as ammonia, for example subjecting the surface of the stocks to a mixture of air and ammonia gas under a pressure greater than atmospheric pressure.

It is obvious that metal or amine salts of other disubstituted dithiocarbamic acids may be employed in producing the class of accelerators disclosed, such as salts of di-n-propyl, di-iso-propyl, dibutyl, methyl phenyl, and penta methylene dithiocarbamic acid or similar substituted acids, and that other corresponding halogen derivatives of dimethyl ether may be employed in place of dichloromethyl-ether. The use of the accelerators disclosed is not confined to mixes containing carbon black, but may be used for acceleration of vulcanization in any type of rubber stock, and other compounding ingredients and vulcanizing agents than those disclosed may be used in conjunction with the new accelerators, all without departing from the principle of the invention.

Having thus described my invention, what I claim and desire to protect by Letters Patent is:

1. A process which comprises treating rubber with an oxy-dimethylene N-substituted dithiocarbamate.

2. A process which comprises vulcanizing rubber in the presence of a compound having the general formula

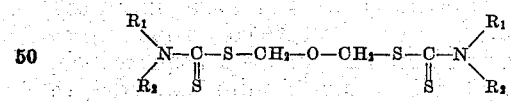

where $R_1$ is an alkyl group and $R_2$ is an alkyl or aryl group, or $R_1$ and $R_2$ together form a divalent radical.

3. A process which comprises vulcanizing rubber in the presence of an oxy-dimethylene N-disubstituted dithiocarbamate.

4. A process which comprises vulcanizing rubber in the presence of an oxy-dimethylene N-dialkyl dithiocarbamate.

5. A process which comprises vulcanizing rubber in the presence of oxy-dimethylene N-dimethyl dithiocarbamate.

6. A process which comprises vulcanizing rubber in the presence of oxy-dimethylene N-diethyl dithiocarbamate.

7. A process which comprises vulcanizing rubber containing sulphur, a metallic oxide, and an oxy-dimethylene-N-substituted dithiocarbamate in the presence of a basic gas.

8. A process which comprises vulcanizing rubber containing sulphur, a metallic oxide, and an oxy-dimethylene-N-substituted dithiocarbamate in the presence of ammonia.

9. A process which comprises vulcanizing rubber containing sulphur, a metallic oxide, and an oxy-dimethylene N-dialkyl dithiocarbamate in the presence of a basic gas.

10. A process which comprises vulcanizing rubber containing sulphur, a metallic oxide, and an oxy-dimethylene N-dialkyl dithiocarbamate in the presence of ammonia.

11. A rubber product resulting from the process set forth in claim 1.

12. A rubber product resulting from the process set forth in claim 2.

13. A rubber product resulting from the process set forth in claim 3.

14. A rubber product resulting from the process set forth in claim 4.

15. A rubber product resulting from the process set forth in claim 5.

16. A rubber product resulting from the process set forth in claim 6.

17. A rubber product resulting from the process set forth in claim 7.

18. A rubber product resulting from the process set forth in claim 8.

19. A rubber product resulting from the process set forth in claim 9.

20. A rubber product resulting from the process set forth in claim 10.

21. A vulcanization accelerator comprising an oxy-dimethylene N-substituted dithiocarbamate.

Signed at Passaic, county of Passaic, State of New Jersey, this 15th day of October, 1930.

LOUIS H. HOWLAND.